US012810347B2

(12) United States Patent
Wei

(10) Patent No.: US 12,810,347 B2
(45) Date of Patent: Nov. 24, 2026

(54) STORE ALLOCATION SYSTEM AND METHOD USING THE SAME

(71) Applicant: M2COMMUNICATION INC., Hsinchu County (TW)

(72) Inventor: Derrick Wei, Zhubei City (TW)

(73) Assignee: M2COMMUNICATION INC., Zhubei City (TW)

( * ) Notice: Subject to any disclaimer, the term of this patent is extended or adjusted under 35 U.S.C. 154(b) by 78 days.

(21) Appl. No.: 18/884,737

(22) Filed: Sep. 13, 2024

(65) Prior Publication Data

US 2026/0080458 A1 Mar. 19, 2026

(51) Int. Cl.
*G06Q 30/00* (2023.01)
*G06Q 30/0601* (2023.01)

(52) U.S. Cl.
CPC ..... *G06Q 30/0639* (2013.01); *G06Q 30/0625* (2013.01)

(58) Field of Classification Search
CPC ........... G06Q 30/0639; G06Q 30/0625; G06Q 30/0629; G06Q 30/0627; G06Q 30/06291
USPC ........................................................ 705/26, 27
See application file for complete search history.

(56) References Cited

U.S. PATENT DOCUMENTS 10,438,214 B1 * 10/2019 Kim ........................ G06Q 30/02
2009/0125380 A1 * 5/2009 Otto ................... G06Q 30/0201 705/7.29
2016/0055562 A1 * 2/2016 Kim ........................ H04W 4/80 705/26.61
2020/0132470 A1 * 4/2020 Xu ..................... G06Q 30/0643

OTHER PUBLICATIONS

Peterson: "Kroger's New Technology Could Change Grocery Shopping as We Know It," Inc.com, Jan. 8, 2019, 8pgs; (Year: 2019).*
Scorpion Planogram, "Integrating Electronic Shelf Label Software into Your Current Store Design," www.scorpionplanogram.com; Nov. 7, 2023, 3pgs; (Year: 2023).*

* cited by examiner

*Primary Examiner* — Robert M Pond
(74) *Attorney, Agent, or Firm* — Volpe Koenig

(57) ABSTRACT

The present invention provides a store allocation system and method using the same. The store allocation system includes a plurality of electronic shelf labels (ESL) and a store allocation server connected to the ESLs. The store allocation server includes a processor; a storage device configured to the processor and configured to store a first association between the plurality of ESLs and a plurality of products of each store, and a second association between the plurality of products and a plurality of shelves of each store; an application interface module connected to the processor and configured to allow a user device to wirelessly communicate with the store integration server; and a searching unit connected to the processor and the storage device, and configured to search a specific product in the storage device based on a search request from the user device and produce a search result.

20 Claims, 10 Drawing Sheets

STORE ALLOCATION SYSTEM AND METHOD USING THE SAME

FIELD OF THE INVENTION

The present invention is related to a store allocation system and method using the store allocation system. Particularly, the present invention is related to a store allocation application and method using the store allocation system being an online tool to increase the visibility and the accuracy of the products in the store.

BACKGROUND OF THE INVENTION

As the business development, varied products are provided for customers to choose in pharmacies or independent stores. While the products are arranged on a shelf, shelf labels can be used for informing the customers the name, the price or the promotion of the products. Currently, the shelf labels are made of printed papers and are put on the shelves by manpower, and the shelf labels have to be replaced when the information or the placements of the products are changed. However, whenever there is limited manpower, the shelf labels for the products cannot be updated in real time.

With electronic shelf label used in the retail stores, even if the information can be remotely updated, this information can only be available for the staffs and customer in the store. Most small-to-medium stores may only have a small marketing budget or limited sales channels, so it is difficult to push the highlighted products to attract many customers.

It is therefore the Applicant's attempt to deal with the above situations encountered in the prior art.

SUMMARY OF THE INVENTION

The present invention establishes virtual shelves of the stores, which is a good digital tool with high accuracy to real-time update the information on the products on the shelves. Furthermore, the present invention also establishes an application for the store allocation to increase the chances of customers coming to the stores.

In accordance with an aspect of the present disclosure, an electronic shelf label (ESL) system used for a store is disclosed, wherein the store has a plurality of shelves displaying a plurality of products, each of the plurality of products has a first barcode. The ESL system includes: a plurality of ESLs configured on the plurality of shelves, and each of the plurality of ESLs has a label ID, a second barcode or an embedded identification unit requiring no power, such as Near Field Communication (NFC) of Radio-Frequency Identification (RFID) chip, corresponding to the label ID, and a display unit; and a server connected to the plurality of ESLs, and including: a processor; a transceiver connected to the processor and configured to receive product information of the plurality of products from an enterprise resource planning (ERP)/point of sale (POS) system, wherein each of the first barcodes corresponds to each of the product information; and a storage device connected to the processor and includes: a product database configured to store the product information; an ESL database connected to the product database and configured to store a label information of the plurality of ESLs; and an application configured to allow a user device to wirelessly communicate with the server, wherein: when the first barcode of a specific product and the second barcode or the identification unit of a specific ESL are successively scanned or sensed, the processor is configured to set up a first association between the specific ESL and the specific product; and when the user device communicates with the server through the application, the server sends at least one of the product information, the label information and the first association to the user device.

In accordance with another aspect of the present disclosure, a method performed by the ESL system is disclosed, wherein the store has a plurality of shelves displaying a plurality of products, each of the plurality of products has a first barcode. The method includes: establishing the application in the storage device; storing the label information of the plurality of ESLs in the ESL database; receiving the product information from the ERP/POS system; storing the product information in the product database; successively scanning the first barcode of the specific product and the second barcode or the identification unit of the specific ESL by a scanner or a carrier device reader; setting up the first association between the specific ESL and the specific product; and sending at least one of the product information, the label information and the first association to the user device, when the user device communicates with the server through the application.

In accordance with one more aspect of the present disclosure, an electronic shelf label (ESL) server used for a store is provided, wherein the store has a plurality of shelves displaying a plurality of products and a plurality of ESLs configured on the plurality of shelves, each of the plurality of products has a first barcode and a product information, each of the plurality of ESLs has a label ID and a second identification unit corresponding to the label ID. The ESL server includes: a processor; and a transceiver connected to the processor and configured to receive the product information, wherein: the product information is received from an enterprise resource planning (ERP)/point of sale (POS) system; and when the first barcode of a specific product is scanned and the identification unit of a specific ESL are scanned or sensed, the processor is configured to set up a first association between the specific ESL and the specific product.

In accordance with one more aspect of the present disclosure, a store allocation system for integrating a plurality of stores is disclosed, wherein each of the plurality of stores has a plurality of shelves displaying a plurality of products. The store allocation system includes: a plurality of electronic shelf labels (ESL) configured on the plurality of shelves; and a server connected to the plurality of ESLs. The server includes: a processor; a storage device connected to the processor and configured to store a first association between the plurality of ESLs and the plurality of products of each store, and a second association between the plurality of products and the plurality of shelves of each store, wherein the first association and the second association are set up by the processor, and the second association confirms a location of each product; an application interface module connected to the processor and configured to allow a user device to wirelessly communicate with the server through an application on the user device; and a searching unit connected to the processor and the storage device, and configured to search a specific product in the storage device based on a search request from the user device through the application interface module and produce a search result, wherein when the search request is transmitted from the user device by a customer, the search result includes information of at least one store having the specific product with an e-map.

In accordance with one more aspect of the present disclosure, a using method of the store allocation system is disclosed. The method includes: providing the server having the storage device, the processor the application interface module and the searching unit, wherein the storage device is configured to store the first association between the plurality of ESLs and the plurality of products of each store, and the second association between the plurality of products and the plurality of shelves of each store; storing, by the processor, the label information of the plurality of ESLs, the product information received from the ERP/POS system, and the shelf information in the storage device, wherein the shelf information includes the locations of each of the shelves; receiving, by the application interface module, a search request from the user device through the application for searching the specific product searching, by the searching unit, the specific product in the storage device based on the search request and producing the search result; and sending, by the application interface module, the search result to the user device, wherein when the search request is transmitted from the user device by a customer, the search result includes information of at least one store having the specific product with an e-map.

In accordance with one more aspect of the present disclosure, a store allocation server for integrating a plurality of stores is disclosed. Each of the plurality of stores has a plurality of shelves displaying a plurality of products and a plurality of electronic shelf labels (ESL) configured on the plurality of shelves. The store allocation server includes: a processor; a storage device connected to the processor and configured to store a first association between the plurality of ESLs and the plurality of products of each store, and a second association between the plurality of products and the plurality of shelves of each store, wherein the first association and the second association are set up by the processor, and the second association confirms locations of each product; an application interface module connected to the processor and configured to allow a user device to wirelessly communicate with the store integration server through an application on the user device; and a searching unit connected to the processor and the storage device, and configured to search a specific product in the storage device based on a search request from the user device and produce a search result, wherein when the search request is transmitted from the user device by a customer, the search result includes information of at least one store having the specific product with an e-map.

BRIEF DESCRIPTION OF THE DRAWINGS

Other objectives, advantages and efficacies of the present invention will be described in detail below taken from the preferred embodiments with reference to the accompanying drawings.

DETAILED DESCRIPTION OF THE PREFERRED EMBODIMENTS

Figure 1:
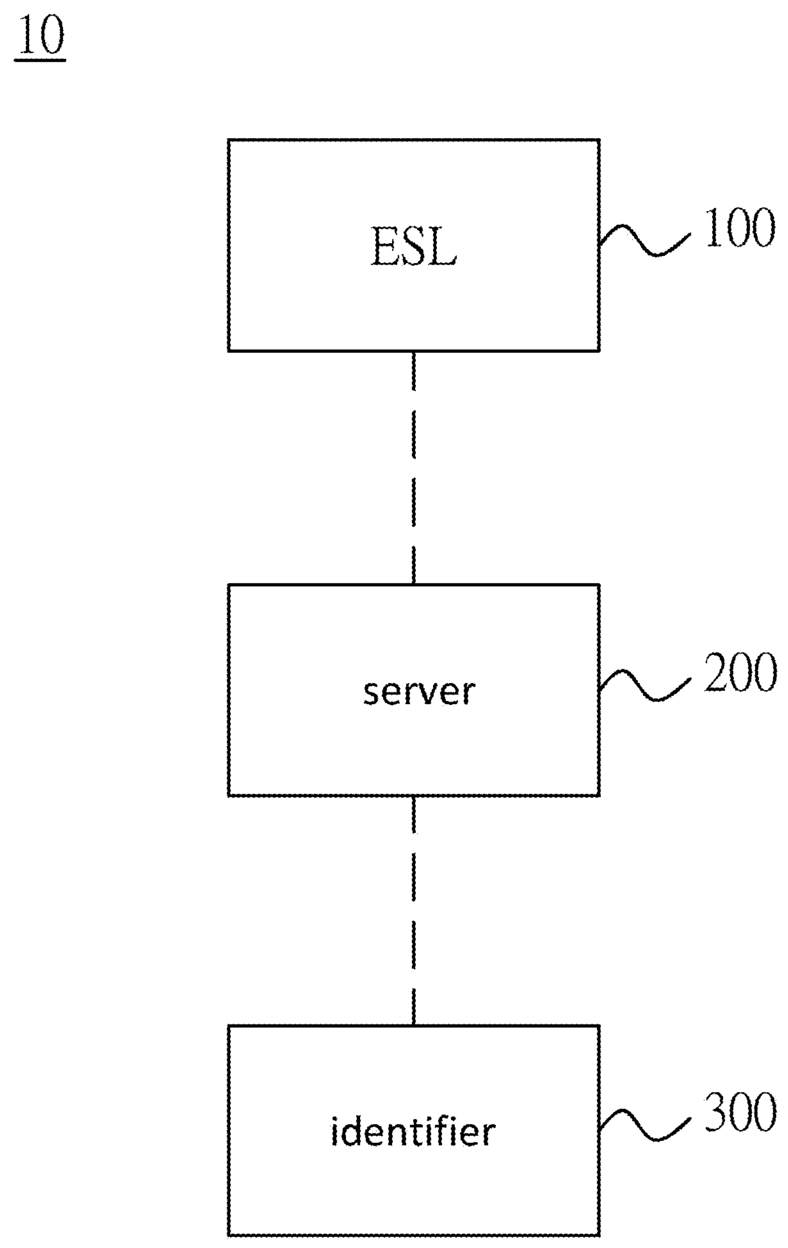
FIG. 1 shows a schematic diagram of a store allocation system according to an embodiment of the present invention.

The present invention will now be described more specifically with reference to the following embodiments. It is to be noted that the following descriptions of preferred embodiments of this invention are presented herein for purpose of illustration and description only; they are not intended to be exhaustive or to be limited to the precise form disclosed. In the preferred embodiments, the same reference numeral represents the same element in each embodiment.

Figure 2A:
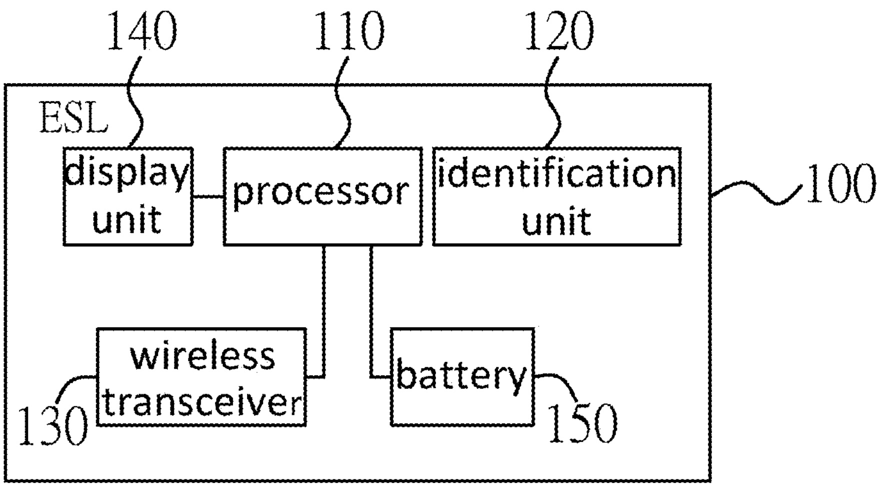
FIG. 2A shows a schematic diagram of an electronic shelf label (ESL) of the store allocation system of the present invention.

A store allocation system of the present invention is used for integrating a plurality of stores. The store can be a pharmacy, a convenience store, a supermarket, a hypermarket, etc., which needs shelves to display a plurality of products. Please refer to FIGS. 1, 2A and 2B, which are schematic diagrams of the store allocation system of the present invention. The store allocation system 10 of the present invention includes a plurality of ESLs 100, a server 200 and an identifier 300, wherein the ESLs 100 and the identifier 300 can wirelessly communicate with the server 200.

In the store, there are pluralities of shelves displaying the products. Each of the products has a first identification unit, wherein the first identification units of the products indicate the product information of the products, and the first identification unit can be a barcode printed on a package of the product, or implied in a code carrier device embedded in the package of the product. The code carrier device can be an NFC tag, a RFID chip or other code carrier device using NFC or RFID technique known in the art. The ESLs 100 are configured on the shelves for displaying the information of the corresponding products, and each of the ESLs 100 has a label ID and a second identification unit, and the label ID for each ESL 100 is a MAC address. Each of the ESLs 100 includes a processor 110, a second identification unit 120, a wireless transceiver 130, a display unit 140 and a battery 150. The second identification unit 120 of the ESLs 100 indicates the label information of the ESLs 100. The second identification unit 120 can be a barcode printed on the ESL 100, or implied in a code carrier device embedded in the ESL 100. The code carrier device can be an NFC tag, a RFID chip or other code carrier device using NFC or RFID technique known in the art. The processor 110 is respectively electrically connected to the wireless transceiver 130, the display unit 140 and the battery 150. The wireless transceiver 130 is configured to receive any information from the server 200, the display unit 140 can be an electronic paper or a liquid crystal display, and the battery 150 is configured to provide electricity for the operation of the ESLs 100.

Figure 2B:
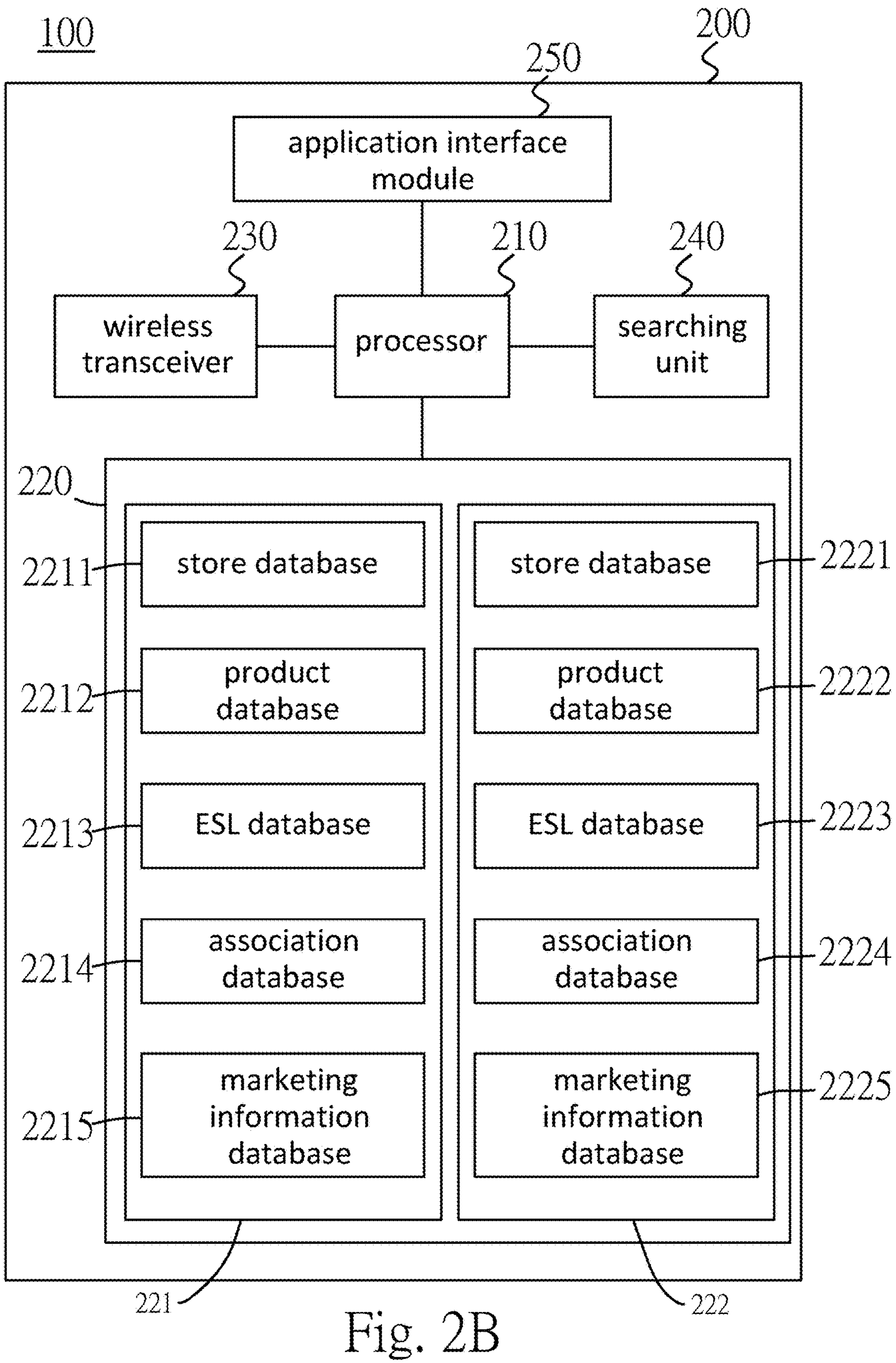
FIG. 2B shows a schematic diagram of a server of the store allocation system of the present invention.

In an embodiment of the present invention, the server 200 includes a processor 210, a storage device 220, an application interface module 250, a wireless transceiver 230 and a searching unit 240. The processor 210 is respectively electrically connected to the storage device 220, the application interface module 250, the wireless transceiver 230 and the searching unit 240. The storage device 220 includes a plurality of storage units for different stores. Therefore, one storage unit stores all information in one store. In FIG. 2B, the storage device 220 includes, for example, two storage units 221 and 222, however, the present invention is not limited to two storage units. Each of the plurality of storage units 221/222 includes a store database 2211/2221, a product database 2212/2222, an ESL database 2213/2223, an association database 2214/2224, and a marketing information database 2215/2225. Taking the storage unit 221 as an example, the store database 2211 is configured to store store information including an address and/or a coordinate of the store, the product database 2212 is configured to store the product information of the products in the store, the ESL database 2213 is configured to store the label information of the ESLs in the store, the association database 2214 is configured to store a first association, and the marketing information database 2215 is configured to store marketing information to be published. The application interface module 250 is configured to allow a user device to wirelessly communicate with the server 200 through an application on the user device. In another embodiment, the store database 2211, the product database 2212, the ESL database 2213, the association database 2214 and the marketing information database 2215 may be electrically connected to one another.

Figure 3A:
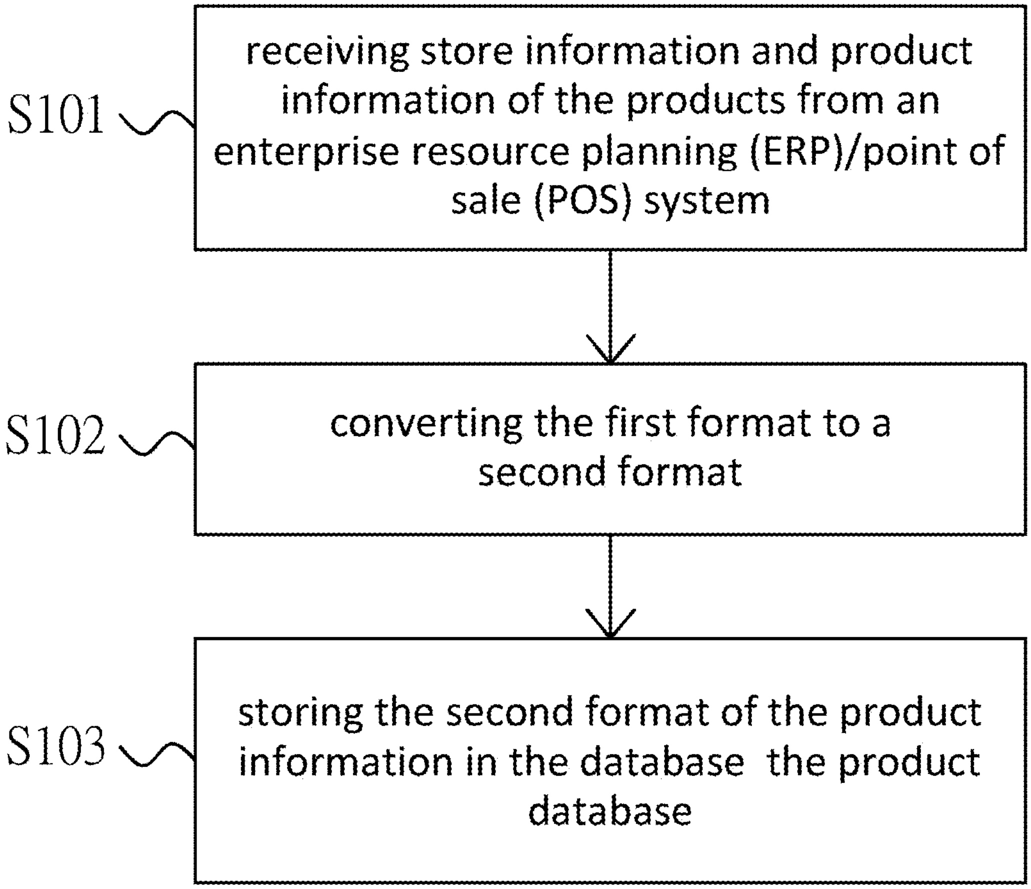
FIG. 3A shows a flow chart of the method for storing the product information of the products in the product database of the store allocation system of the present invention.
Figure 3B:
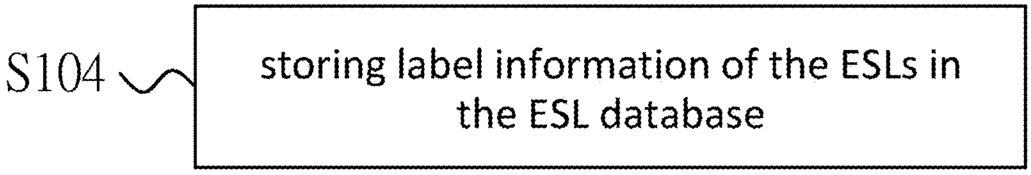
FIG. 3B shows a flow chart of the method for storing the label information of the ESLs in the ESL database of the store allocation system of the present invention.
Figure 4:
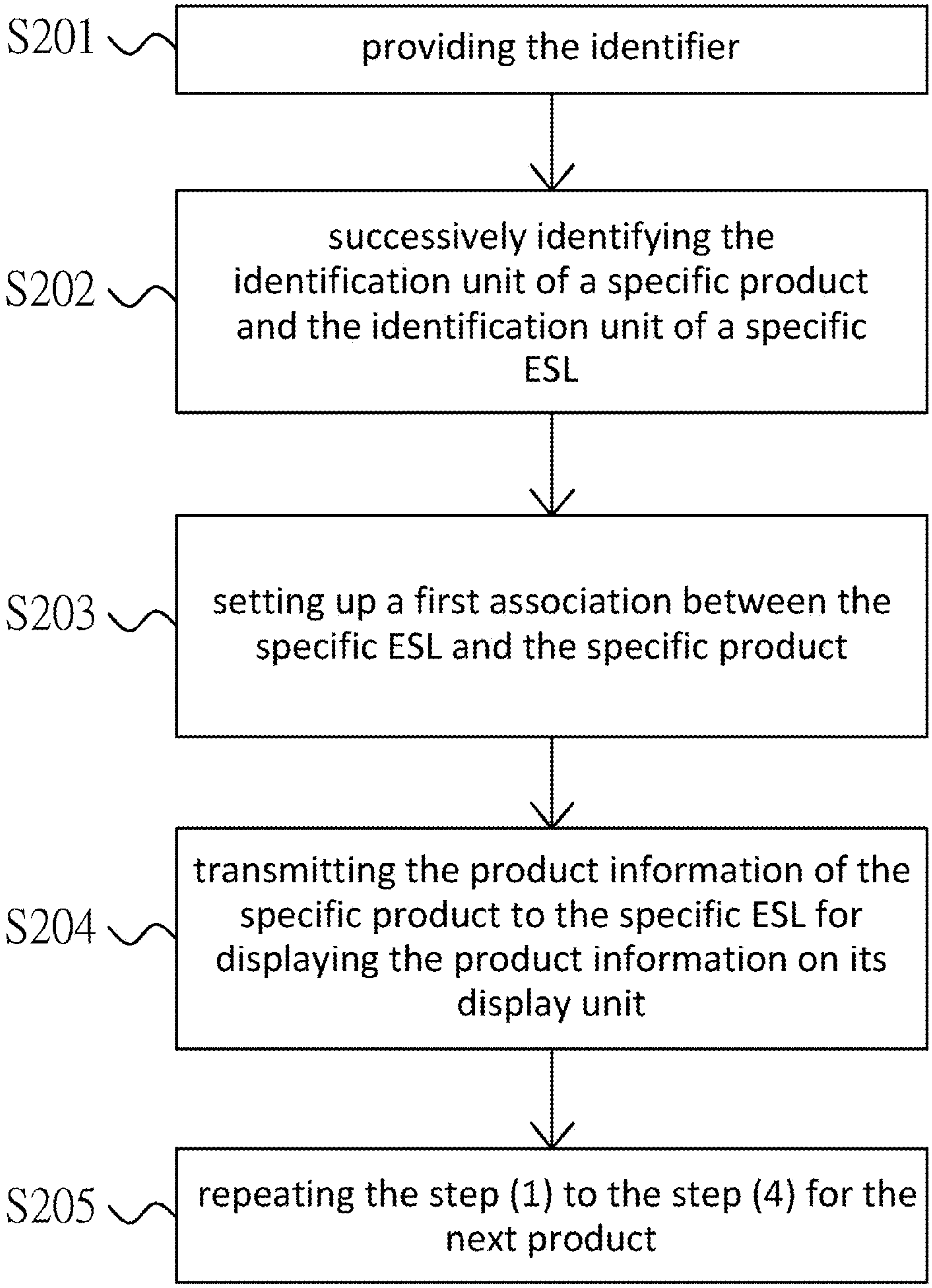
FIG. 4 shows a flow chart of the method for associating the ESLs and the products using the store allocation system of the present invention.

Before using the store allocation system 10, the storage device 220 is set up by storing information of the stores, the products and the ESLs 100. Please refer to FIGS. 2B and 3A, the store database 2211 and the product database 2212 are set up by the following steps: (1) receiving, by the wireless transceiver 230 of the server 200, store information of the store and product information of the products from an enterprise resource planning (ERP)/point of sale (POS) system (Step 101), wherein the store information and the product information are received in a first format from the ERP/POS system, and the first format is, for example, an API information format, such as XML or JSON; (2) converting, by the processor 210 of the server 200, the first format to a second format (Step 102), wherein the second format is, for example, a database software format; and (3) storing, by the processor 210 of the server 200, the second format of the product information in the store database 2211 and the product database 2212 (Step 103). Please refer to FIGS. 2B and 3B, the ESL database 2213 is set up by the following step: (1) storing label information, by the processor 210 of the server 200, of the ESLs 100 in the ESL database 2213 (Step 104), wherein the label information includes, for example, the label IDs. When the ESLs 100 are registered in the ESL database 2213, it is available for association actions done by a store manager.

The product database 2212 of the present invention only stores the information needed for the products for selling, such as the name, number, price, expiration date, vendor of the product. That is to say, the sensitive data, such as the product cost and the personal data, in the ERP/POS system are excluded to prevent the sensitive data from being exposed to the public.

When the ERP/POS system is updated, Step 101 to Step 104 are repeated to update the product database 2212 of the present invention. Specifically, the update of the product database 2212 is “One-direction” from the ERP/POS system to the product database 2212 of the present invention.

After the product database 2212 and the ESL database 2213 have been set up, the products need to be associated with the ESLs 100 by a mapping method to show the product information on the ESL 100. Please refer to FIGS. 1, 2A, 2B and 4, the first associations between the products and the ESLs 100 are set up by the following steps: (1) providing the identifier 300 (Step 201), wherein the identifier 300 is a handheld device or a carrier device reader, and can be any device that can scan or detect the identification units in the art, specifically, the identifier 300 can be a scanner scanning the barcode, a NFC detector detecting the NFC tag or a RFID detector detecting the RFID chip; (2) successively scanning or detecting, by the identifier 300, the first identification unit of a specific product and the second identification unit of a specific ESL 100 (Step 202), wherein the second identification unit 120 of the ESL 100 can be the MAC address; (3) setting up, by the processor 210 of the server 200, the first association between the specific ESL 100 and the specific product (Step 203); (4) transmitting, by the wireless transceiver 230 of the server 200, the product information of the specific product to the specific ESL 100 for displaying the product information on its display unit 140 (Step 204); and (5) repeating the step (1) to the step (4) for the next product (Step 205). In Step 202, the identifying order can be one product and one ESL 100, or one product and multiple ESLs 100, namely, the product information of one product can be displayed on one or more ESL(s) 100. Therefore, upon the mapping method above, the first associations between all products in the product database 2212 and all ESLs 100 in the ESL database 2213 are set up. Once the first association is set, the ESL database 2213 is independent from the ERP/POS system, by storing only the information needed for the products placed on the shelves, and an ESL library is established. In other words, the ESL library represents the “Shelf ERP”, by registering the products displayed for sale from the warehouse inventory to the shelf through the first association.

Specifically, what products are arranged on the shelves for sale in the store accurately stored in the server 200.

Figure 5:
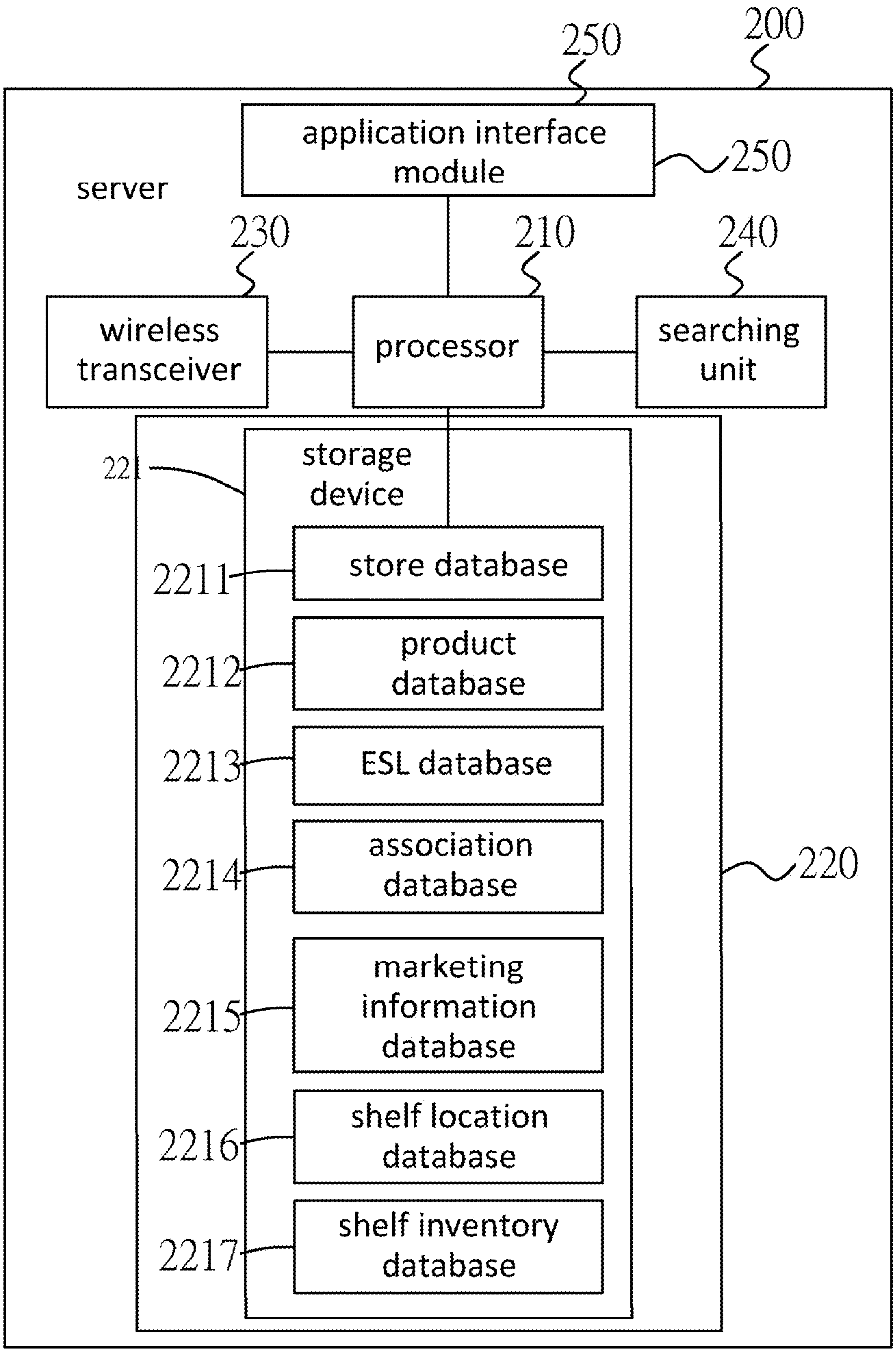
FIG. 5 shows a schematic diagram of the server of the store allocation system according to another embodiment of the present invention.
Figure 6:
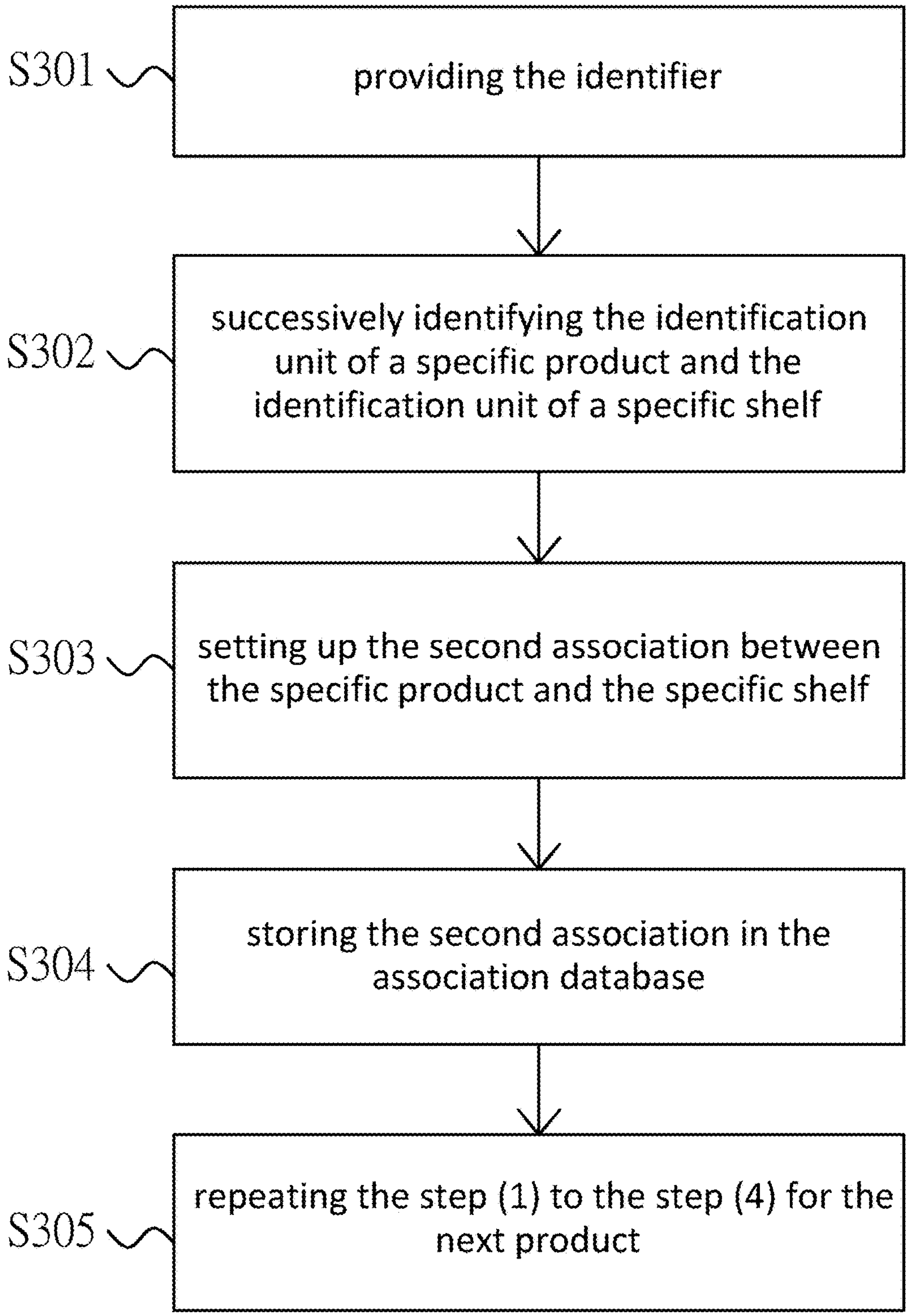
FIG. 6 shows a flow chart of the method for associating the products and the shelves using the store allocation system of the present invention.

In a further embodiment, the products can be associated with the shelf locations in the store by a mapping method to put the products on the virtual shelves. Therefore, the storage device 220 of the server 200 further includes a shelf location database 2216, as shown in FIG. 5. The shelf location database 2216 can be connected to the store database 2211, the product database 221, the ESL database 2213, the association database 2214 and the marketing information database 2215 in the storage device 220. The shelf location database 2216 is configured to store a serial number and a location of each of the shelves and each of the shelves in the store has the third identification unit indicating the serial number and the location of the shelf in the store. The third identification unit can be a barcode printed on the shelf, or implied in a code carrier device embedded in the shelf. The code carrier device can be an NFC tag, a RFID chip or other code carrier device using NFC or RFID technique known in the art. Therefore, before or after setting the first association between the product database 2212 and the ESL database 2213, a second association between the products and the shelves is set up. Please refer to FIGS. 1, 5 and 6, the second associations between the products and the shelves are set up by the following steps: (1) providing the identifier 300 (Step 301); (2) successively scanning or detecting, by the identifier 300, the first identification unit of a specific product and the third identification unit of a specific shelf (Step 302); (3) setting up, by the processor 210 of the server 200, the second association between the specific product and the specific shelf (Step 303); (4) storing, by the processor 210 of the server 200, the second association in the association database 2214 (Step 304); and (5) repeating the step (1) to the step (4) for the next product (Step 305). Therefore, upon the mapping method above, the second associations between all products in the product database 2212 and all shelf locations in the shelf location database 2215 are set up, and thus, the accurate locations of the products on the shelves are set up. Specifically, what products are arranged on the shelves for selling in the store and the specific locations of the products on the shelves are accurately stored in the server 200. Under the first association and the second association being set up, the product, the product information and the location of the products are confirmed.

In other embodiment, the second association is done between the label ID, by the first barcode of the product, and the third barcode printed on the shelf specifying the location where the product should be located. The shelf location database of the server will provide the desired mapping between the product and the shelf location. When second association is executed as optional, the product placement on the shelf will be validated compared to the shelf location database, and the corresponding display will be shown on the corresponding ESL which is associated with the scanner product, i.e. correct shelf location for the product to be placed.

In other embodiment, a second association can be a mapping method between the ESLs and the shelves before the first association been set up, and the second association can be set up by the same identifying method for the ESLs and the shelves above. Under the second association being set up, when the first association between the product database and the ESL database is set up, the product, the product information and the location of the products are confirmed.

In an embodiment, the first association and the second association can be independent or mixed. That is to say, the first association and the second association can be set up, separately, which are described as above. The first association and the second association can also be set up together by scanning or detecting the first identification unit, the second identification unit and the third identification unit together.

Figure 7:
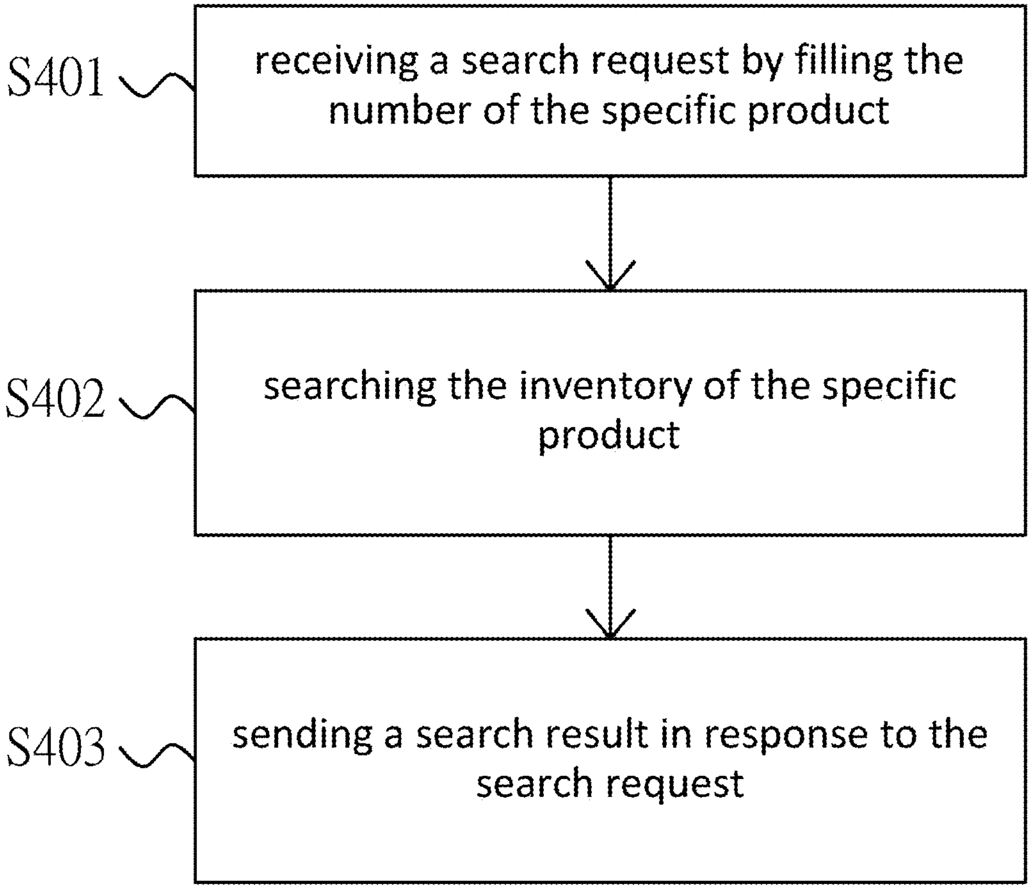
FIG. 7 shows a flow chart of the method for inventorying the products using the store allocation system of the present invention.

In a further embodiment, the storage device 220 of the server 200 further includes a shelf inventory database 2216, as shown in FIG. 5. The shelf inventory database 2216 can be connected to the store database 2211, the product database 2212, the ESL database 2213, the association database 2214 and the shelf location database 2215 in the storage device 220. The shelf inventory database 2216 is configured to store an inventory of the products. Please refer to FIGS. 5 and 7, the inventory of the products can be obtained by the following steps: (1) receiving, via the searching unit 240 of the server 200, a search request by filling the number of the specific product (S401); (2) searching, by the searching unit 240 of the server 200, the inventory of the specific product (S402); and (3) sending, by the wireless transceiver 230 of the server 200, a search result in response to the search request (S403). Therefore, the inventory of the products can be checked using the store allocation system of the present invention at any time.

Therefore, through the store allocation system 10 of the present invention, a new database showing what products are on the shelves and updating in real time can be done by the manager of the store. With this store allocation system 10, the ESL library represents the "virtual space" of what's displayed on the shelves. Therefore, by linking additional information into the ESL library, this "virtual space" can be more and more equivalent to the real store.

The store allocation system 10 of the present invention also provides a service platform for the manager of the store and the customers by establishing the application interface module 250 for the store allocation of the present invention. The application interface module 250 is configured to allow a user device to wirelessly communicate with the server 200 through an application on the user device. The user device can be a mobile device, a desktop computer and a laptop. When the user device wirelessly communicates with the server 200 through the application interface module 250, the server 200 sends at least one of the product information, the label information and the first association to the user device.

When the user device communicates to the server 200 through the application interface module 250 by the manager of the store, the server 200 sends the product information, the label information and/or the location of the product in his own store to the user device of the manager. Specifically, the manager of the store can view and manage his own store online. Furthermore, the application interface module 250 provides an advertisement platform for the manager to promote the products in the store. For this function, the manager can edit marketing information in the application interface module 250 via the application of the user device, and the processor 210 is configured to store the marketing information in the marketing information database 2215 of the storage device 220. In addition, the manager of the store can search the specific product through the application interface module 250. When the server 200 receives a search request of a specific product from the user device through the application interface module 250, the searching unit 240 is configured to search the location and the product information of the specific product, and the application interface module 250 sends a search result to the user device.

In another embodiment, the manager of the store can also check the inventory of the products through the application interface module 250 using the application on the user device. Therefore, when the manager searches the specific product by filling the number of the specific product through the application interface module 250 using the application on the user device, the application interface module 250 sends the search result in response to the search request to the manager.

Figure 8:
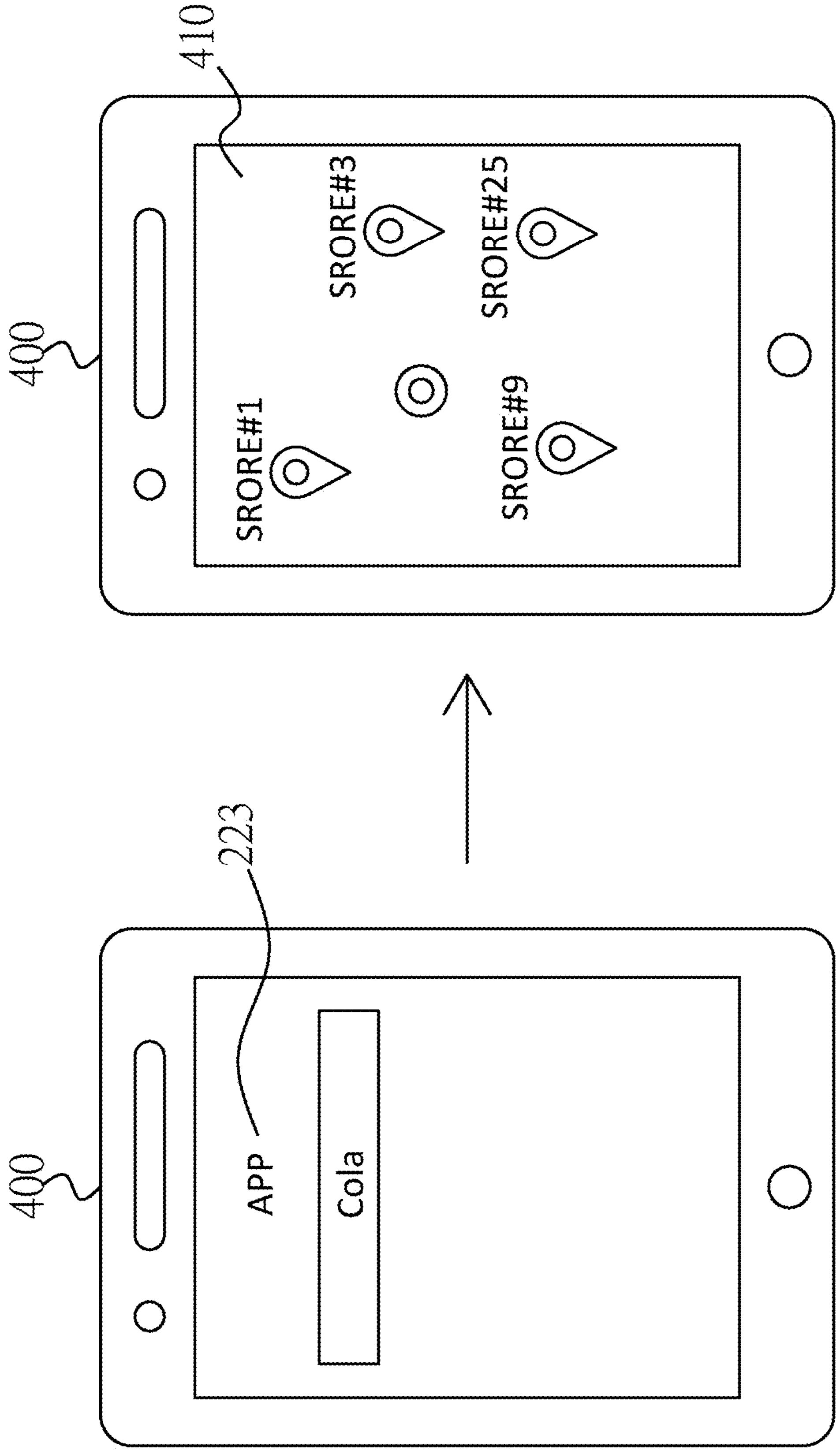
FIG. 8 shows a schematic diagram of the application of the present invention on the user device.
Figure 9:
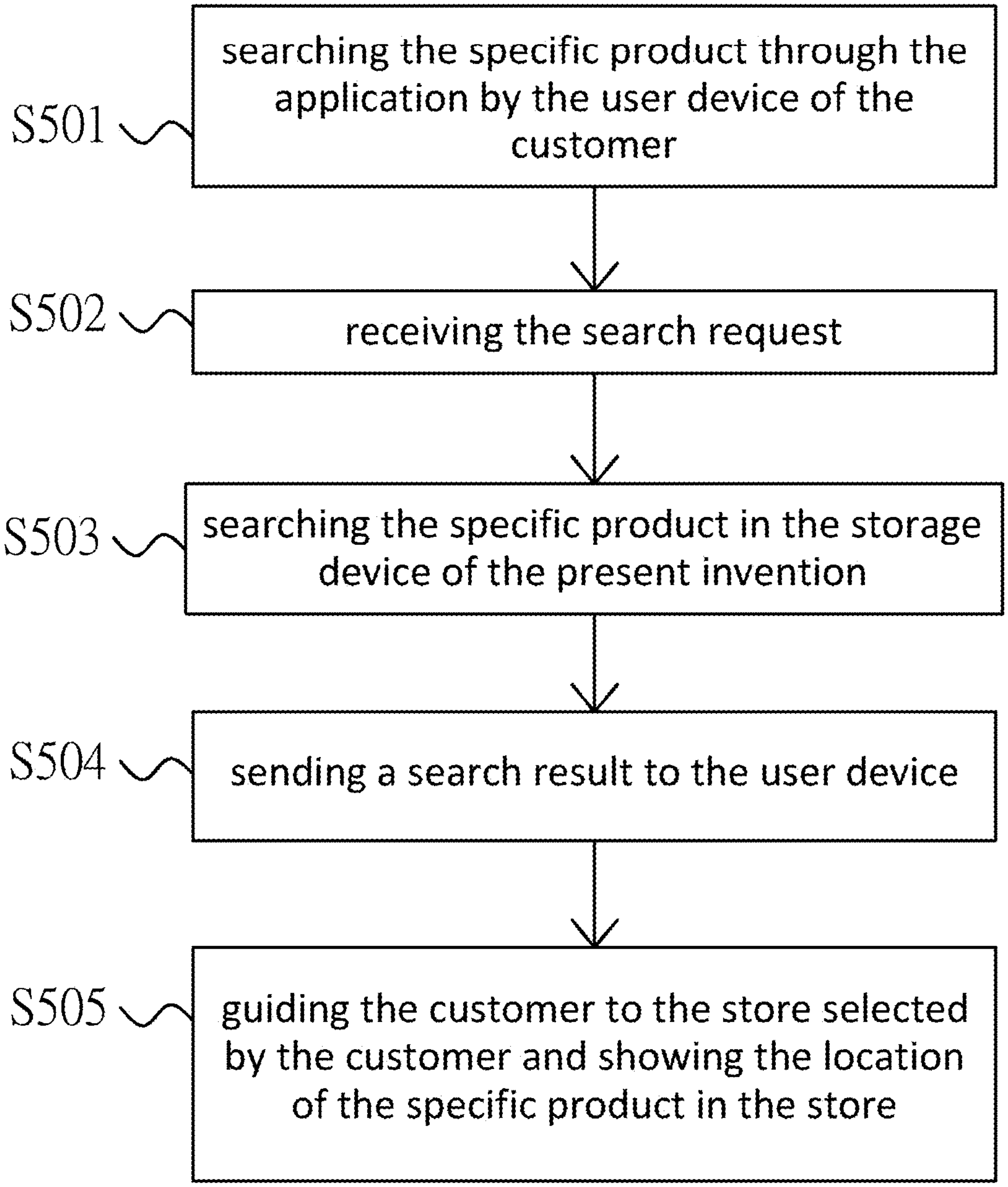
FIG. 9 shows a flow chart of the method for searching a specific product using the store allocation system of the present invention.

The store allocation system 10 of the present invention establishes a guidance service for the customer. By combining the ESL library of the present invention with an e-map, the Store allocation system 10 can guide the customer to the store having the product that he needs. In an embodiment, as shown in FIGS. 5 and 8-9, when the user device 400 searches the specific product through the application 420 by the customer (S501), the server 200 of the present invention performs the following steps: (1) receiving, by the wireless transceiver 230, the search request (S502); (2) searching, by the searching unit 240, the specific product in the storage device 220 of the present invention (S503); (3) sending, by the wireless transceiver 230, a search result to the user device (S504), wherein the search result includes information of the stores having the specific product with the e-map 410; and (4) guiding, by the e-map 410, the customer to the store selected by the customer and showing the location of the specific product in the store (S505).

When the user device communicates to the server 200 through the application interface module 250 by the customer, the server 200 also sends the marketing information in the marketing information database 2215 of the storage device 220 edited by the manager of the store to the user device to attract the customer. The marketing information can be a coupon, a promotion information, etc. When the customer selects the marketing information through the application 420, the server 200 also guides the customer to the store via the e-map 410. Also, the application interface module 250 can be a membership system, which can provide additional service, such as a price comparison and a member discount, for the member.

Therefore, the store allocation system and method of the present invention has benefits as follows: (1) realizing the virtual shelves with high accuracy, which gives a good visibility of the products on the shelves; (2) the manager can promote the sales area and the products to the public by registering the products into the ESL library; (3) the customer can use the search services to quickly find the stores/pharmacies to go to and make the purchase, which saves the time and the money; (4) when the ESL system is updated, the information is updated in real time; and (5) the med-to-small stores/pharmacies can compete with big corporations with big marketing budget by going offline to online.

To sum up, the store allocation system of the present invention can act as a service platform for the stores and the customers. For the stores, the store allocation system of the present invention provides the management and the advertisement services, and for the customers, the store allocation system of the present invention provides the search and the guidance services. Therefore, the store allocation system not only promotes the stores to the customers, but also guides the customer to the stores to purchase the product.

Although the present invention has been described with reference to certain exemplary embodiments thereof, it can be understood by those skilled in the art that a variety of modifications and variations may be made to the present invention without departing from the spirit or scope of the present invention defined in the appended claims, and their equivalents.

The invention claimed is:

1. A store allocation system for integrating a plurality of stores, wherein each of the plurality of stores has a plurality of shelves displaying a plurality of products and a plurality of electronic shelf labels (ESLs) are configured on the plurality of shelves, and the store allocation system comprises:

a server connected to the plurality of ESLs and including an ESL database associated with the ESLs, and comprising:

a processor;

a storage device connected to the processor and configured to store a first association between the plurality of ESLs and the plurality of products of each store to form an ESL library, and a second association between the plurality of products and the plurality of shelves of each store, wherein the first association and the second association are set up by the processor, and the second association confirms a location of each product;

once the first association is set, the ESL library stores information for the plurality of products placed on the plurality of shelves to be updated in real time;

the storage device includes a plurality of storage units for respectively storing information in the plurality of stores;

each of the storage units further comprises a shelf inventory database configured to store an inventory of the plurality of products in the store;

the server is connected to an application interface module which is connected to the processor and configured to allow a user device to wirelessly communicate with the server through an application on the user device; and the server includes a searching unit which is connected to the processor and the storage device, and configured to search a specific product in the storage device based on a search request from the user device through the application interface module and produce a search result, wherein when the search request is transmitted from the user device by a customer, the search result includes information of at least one store having the specific product with an e-map combined with the ESL library, wherein the e-map shows a specific shelf location of the specific product within the store based on the second association in the ESL library, and the search result further includes the inventory of the specific product in the store.

2. The store allocation system as claimed in claim 1, wherein:

each of the plurality of products has product information received from an enterprise resource planning (ERP)/point of sale (POS) system and a first identification unit corresponding to each of the product information;

each of the plurality of ESLs has a label ID, a second identification unit corresponding to the label ID and a display unit;

each of the plurality of shelves has a third identification unit corresponding to a shelf location of each of the shelves;

the first association is set up by successively identifying the first identification units of the products and the second identification units of the ESLs; and the second association is set up by successively identifying the first identification units of the products and the third identification units of the shelves.

3. The store allocation system as claimed in claim 2, further comprising an identifier connected to the server and configured to identify the first identification unit, the second identification unit and the third identification unit via one of Near Field Communication (NFC), Radio-Frequency Identification (RFID) and barcode scanning to set up the first association and the second association.

4. The store allocation system as claimed in claim 2, wherein each of the plurality of storage units includes:

a store database configured to store store information including an address and/or a coordinate of the store;

a product database configured to store the product information;

an ESL database configured to store label information of the plurality of ESLs;

a shelf location database configured to store the shelf location of each of the plurality of shelves in the store; and an association database configured to store the first association and the second association.

5. The store allocation system as claimed in claim 4, wherein when the user device communicates with the server through the application interface module by a manager of a specific store, the application interface module is configured to send the product information, the label information and the locations of the products in the specific store to the user device of the manager.

6. The store allocation system as claimed in claim 5, wherein each of the storage units further comprises a marketing information database, the application interface module is configured to receive marketing information edited by the manager through the application on the user device of the manager, and the processor is configured to store the marketing information in the marketing information database.

7. The store allocation system as claimed in claim 6, wherein when the user device communicates with the server through the application interface module by the customer, the application interface module is configured to send the marketing information to the user device of the customer and to provide an advertisement platform for promoting the plurality of products to promote the stores to a user and guide the user to the stores to purchase the plurality of products.

8. The store allocation system as claimed in claim 5, wherein when the user device searches the specific product through the application interface module by the manager, the searching unit is configured to search a specific location, a specific product information and the inventory of the specific product in the specific store and produce the search result, and the application interface module is configured to send the search result to the user device of the manager.

9. The store allocation system as claimed in claim 1, wherein when the user device searches the specific product through the application interface module by the customer, the searching unit is configured to search a specific location and a specific product information of the specific product and produce the search result, and the application interface module is configured to send the search result to the user device of the customer, guide the customer to the specific store with the e-map and show the specific location and the specific product information of the specific product in the specific store.

10. A method of operating a store allocation system, the system including a server having a processor, an application interface module, a searching unit coupled to the application interface module, and a storage device connected to the processor and forming an electronic shelf label (ESL) library for each of a plurality of stores, wherein each of the plurality of stores has a plurality of shelves displaying a plurality of products and the ESL library stores information for the products placed on the plurality of shelves, wherein the storage device is configured to store a first association between the plurality of ESLs and the plurality of products of each store, and a second association between the plurality of products and the plurality of shelves of each store, the first association and the second association are set up by the processor, and the second association confirms a location of each product, the method comprising:

receiving, by the application interface module, a search request from a user device through an application for searching a specific product;

searching, by the searching unit, the specific product in the storage device based on the search request and producing a search result; and sending, by the application interface module, the search result to the user device, wherein when the search request is transmitted from the user device by a customer, the search result includes information of at least one store having the specific product with an e-map combined with the ESL library, wherein the e-map shows a specific shelf location of the specific product within the store based on the second association in the ESL library, and the search result further includes an inventory of the specific product in the store.

11. The method as claimed in claim 10, wherein:

the ESL library represents a virtual space of what is displayed on the shelves;

the store allocation system further comprises an identifier connected to the server;

each of the plurality of products has product information received from an enterprise resource planning (ERP)/point of sale (POS) system and a first identification unit corresponding to each of the product information;

each of the plurality of ESLs has a label ID, a second identification unit corresponding to the label ID and a display unit;

each of the plurality of shelves has a third identification unit corresponding to a shelf location of each of the shelves; and the method further comprises:

successively identifying, by the identifier, the first identification unit of the products and the second identification unit of the ESLs to set up the first association; and successively identifying, by the identifier, the first identification units of the products and the third identification units of the shelves to set up the second association.

12. The method as claimed in claim 11, wherein the first identification unit, the second identification unit and the third identification unit are identified by the identifier via one of near field communication (NFC), radio-frequency identification (RFID) and barcode scanning to set up the first association and the second association.

13. The method as claimed in claim 12, wherein:

the storage device includes a plurality of storage units for respectively storing information in the plurality of stores, and each of the plurality of storage units includes a store database, a product database, an ESL database, a shelf location database and an association database, and the method further comprises:

storing store information in the store database including an address and/or a coordinate of the store;

storing the product information in the product database;

storing label information of the plurality of ESLs in the ESL database;

storing the shelf location of each of the plurality of shelves in the store in the shelf location database; and storing the first association and the second association in the association database.

14. The method as claimed in claim 13, wherein:

each of the storage units further comprises a marketing information database; and when the user device communicates with the server through the application interface module by a manager of a specific store, the method further comprises:

sending, by the application interface module, the product information, the label information and the locations of the products in the specific store to the user device of the manager;

receiving, by the application interface module, marketing information edited by the manager through the application on the user device of the manager; and storing, by the processor, the marketing information in the marketing information database.

15. The method as claimed in claim 14, wherein when the user device communicates with the server through the application interface module by the customer, the method further comprises sending, by the application interface module, the marketing information to the user device of the customer and providing an advertisement platform for promoting the products to promote the stores to a user and guide the user to the stores to purchase the products.

16. The method as claimed in claim 13, wherein:

each of the storage units further comprises a shelf inventory database configured to store an inventory of the products in the store, and when the user device searches the specific product through the application interface module by the manager, the method further comprises:

searching, by the searching unit, a specific location, a specific product information and the inventory of the specific product in the specific store to produce the search result; and sending, by the application interface module, the search result to the user device of the manager.

17. The method as claimed in claim 10, wherein when the user device searches the specific product through the application interface module by the customer, the method further comprises:

searching, by the searching unit, a specific location and a specific product information of the specific product to produce the search result;

sending, by the application interface module, the search result to the user device of the customer;

guiding, by the application interface module, the customer to the specific store with the e-map; and showing, by the application interface module, the specific location and the specific product information of the specific product in the specific store.

18. A store allocation server for integrating a plurality of stores, wherein each of the plurality of stores has a plurality of shelves displaying a plurality of products and a plurality of electronic shelf labels (ESL) configured on the plurality of shelves, and the store allocation server comprises:

a processor;

a storage device connected to the processor and including an ESL database configured to store a first association between the plurality of ESLs and the plurality of products of each store, and a second association between the plurality of products and the plurality of shelves of each store, wherein the first association and the second association are set up by the processor, and the second association confirms locations of each product, and once the first association is set, the ESL database stores information for the plurality of products placed on the plurality of shelves, and an ESL library is established;

an application interface module connected to the processor and configured to allow a user device to wirelessly communicate with the store integration server through an application on the user device; and a searching unit connected to the processor and the storage device, and configured to search a specific product in the storage device based on a search request from the user device and produce a search result, wherein when the search request is transmitted from the user device by a customer, the search result includes information of at least one store having the specific product with an e-map combined with the ESL library, wherein the e-map shows location of the specific product within the store, and the search result further includes an inventory of the specific product in the store.

19. The store allocation server as claimed in claim 18, wherein:

when the user device communicates with the store integration server through the application interface module by a manager of a specific store, the application interface module is configured to send product information, label information and the locations of the products to the user device of the manager, and to provide an advertisement platform for promoting the products to promote the stores to a user and guide the user to the stores to purchase the products; and when the user device searches the specific product through the application interface module by the manager, the searching unit is configured to search the specific location and a specific product information of the specific product, and the application interface module is configured to send a first search result to the user device of the manager.

20. The store allocation server as claimed in claim 19, wherein:

when the user device communicates with the store integration server through the application interface module by the customer, the application interface module is configured to send marketing information edited by the manager of the store to the user device of the customer; and when the user device searches the specific product through the application interface module by the customer, the searching unit is configured to search the specific location and the specific product information of the specific product, the application interface module is configured to send a second search result to the user device of the customer, and guide the customer to the specific store and show the specific location of the specific product in the specific store, wherein the second search result includes information of the specific store having the specific product with an e-map and the specific location and the specific product information of the specific product.

* * * * *